(12) United States Patent
Bucher et al.

(10) Patent No.: US 9,343,851 B2
(45) Date of Patent: May 17, 2016

(54) PLUGGABLE CONNECTOR CONFIGURED TO TRANSFER THERMAL ENERGY AWAY FROM INTERNAL ELECTRONICS OF THE PLUGGABLE CONNECTOR

(71) Applicant: Tyco Electronics Corporation, Berwyn, PA (US)

(72) Inventors: Alan Weir Bucher, Manheim, PA (US); Richard Dean Miller, Lancaster, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 91 days.

(21) Appl. No.: 14/473,750

(22) Filed: Aug. 29, 2014

(65) Prior Publication Data

US 2016/0064873 A1 Mar. 3, 2016

(51) Int. Cl.
| | | |
|---|---|---|
| G02B 6/36 | (2006.01) |
| H01R 13/66 | (2006.01) |
| H05K 7/20 | (2006.01) |
| H01R 12/70 | (2011.01) |
| H01R 12/72 | (2011.01) |
| G02B 6/42 | (2006.01) |

(52) U.S. Cl.
CPC .......... *H01R 13/6691* (2013.01); *G02B 6/4274* (2013.01); *H01R 12/7076* (2013.01); *H01R 12/722* (2013.01); *H05K 7/20436* (2013.01)

(58) Field of Classification Search
None
See application file for complete search history.

(56) References Cited

U.S. PATENT DOCUMENTS

| | | | | |
|---|---|---|---|---|
| 5,838,065 A | * | 11/1998 | Hamburgen | .......... H01L 23/367 257/712 |
| 6,009,938 A | | 1/2000 | Smith et al. | |
| 6,396,693 B1 | | 5/2002 | Shih | |
| 6,604,575 B1 | | 8/2003 | Degtiarenko | |
| 7,489,513 B2 | | 2/2009 | Lai et al. | |
| 2014/0286613 A1 | * | 9/2014 | Ito | .......... G02B 6/4277 385/88 |
| 2015/0043168 A1 | * | 2/2015 | Douglas | .......... H01L 23/00 361/719 |

* cited by examiner

*Primary Examiner* — Hemang Sanghavi

(57) ABSTRACT

Pluggable connector including a connector housing having a leading end configured to mate with a receptacle assembly. The connector housing has an interior cavity. The pluggable connector also includes a communication assembly held by the connector housing. The communication assembly includes internal electronics located within the interior cavity, and a mating terminal located proximate to the leading end. The mating terminal is communicatively coupled to the internal electronics. The pluggable connector also includes a thermal-transfer assembly that is disposed within the interior cavity. The thermal-transfer assembly includes first and second thermal-transfer modules that each include a plurality of spaced-apart projections. The corresponding projections of the first and second thermal-transfer modules are interleaved with one another. The first thermal-transfer module is coupled to the internal electronics, and the second thermal-transfer module is coupled to the connector housing.

20 Claims, 5 Drawing Sheets

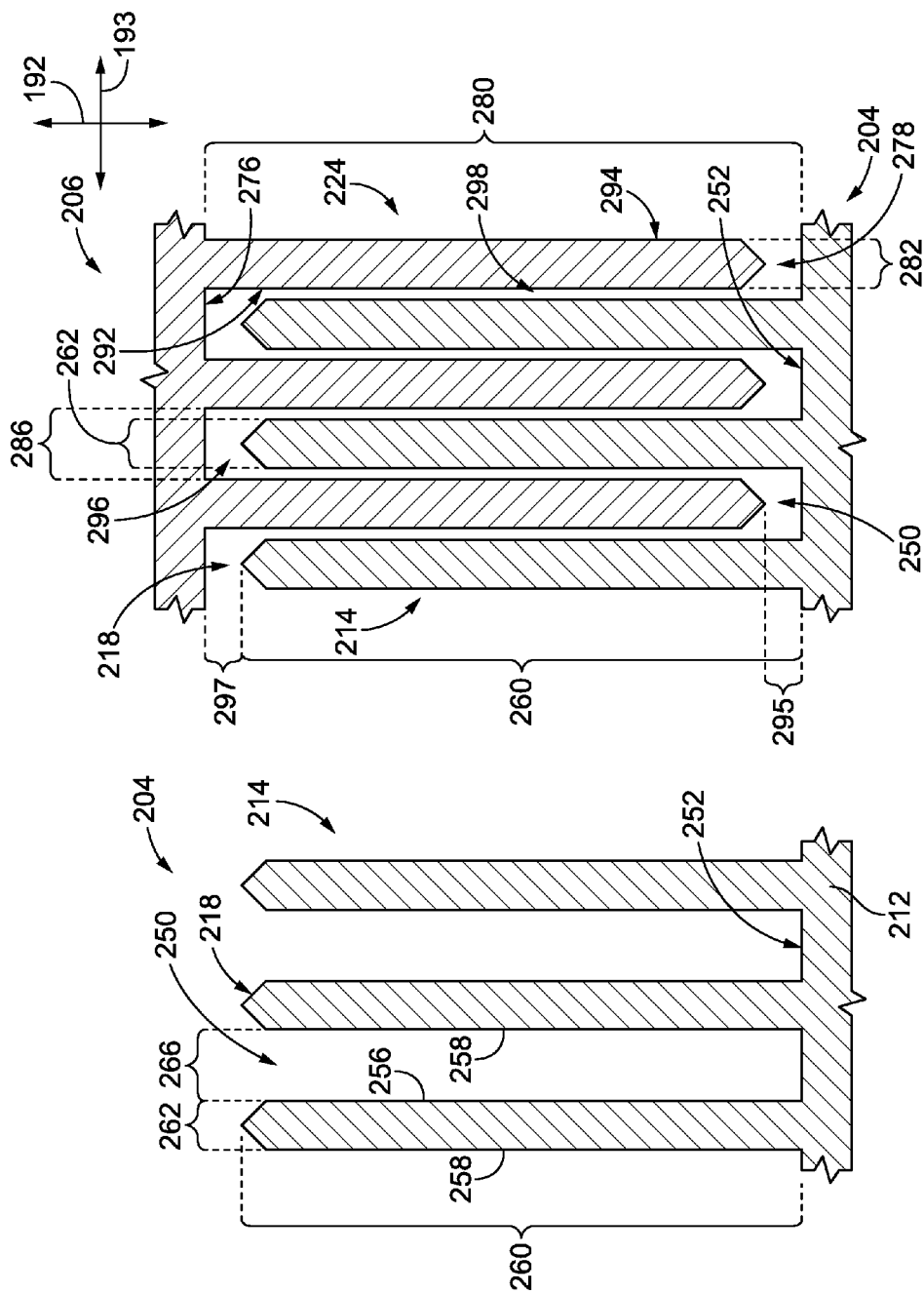

PLUGGABLE CONNECTOR CONFIGURED TO TRANSFER THERMAL ENERGY AWAY FROM INTERNAL ELECTRONICS OF THE PLUGGABLE CONNECTOR

BACKGROUND

The subject matter herein relates generally to a pluggable connector that is configured to transfer thermal energy (or heat) generated within the pluggable connector to an exterior of the pluggable connector for dissipation into the surrounding environment.

Pluggable connectors may be used to transmit data and/or electrical power to and from different systems or devices. For example, a cable assembly (or plug assembly) typically includes two or more pluggable connectors that are interconnected through one or more communication cables. Data signals may be transmitted through the communication cable(s) in the form of optical signals and/or electrical signals. Electrical power may also be transmitted through the communication cable(s). Each pluggable connector includes a connector housing having a leading end that is mated with a receptacle assembly and a back end that is coupled to the corresponding communication cable. For some types of pluggable connectors, the pluggable connector includes a circuit board within the connector housing. The circuit board has contact pads that are exposed at the leading end of the connector housing. During a mating operation, the leading end is inserted into a cavity of the receptacle assembly and advanced in a mating direction until the contact pads of the circuit board engage corresponding contacts of a mating connector of the receptacle assembly.

A common challenge that developers of pluggable connectors often confront is heat management. Heat generated by internal electronics within the pluggable connector can degrade performance or even damage the pluggable connector. For example, pluggable connectors may include an electro-optical (E/O) engine that is coupled to an interior circuit board of the pluggable connector. The E/O engine transforms data signals from an electrical form to an optical form or vice versa. This transformation process can generate a substantial amount of heat within the pluggable connector. To dissipate the heat, the pluggable connector includes a thermal bridge that engages the E/O engine and transfers the heat away.

The thermal bridge has surfaces that engage corresponding surfaces of the E/O engine. To ensure sufficient heat transfer, the pluggable connector is configured such that a thermal pad is compressed between the connector housing and the corresponding surface of the bridge. As such, the thermal pad exerts a force against the E/O engine via the thermal bridge. This normal force, however, increases the likelihood of damage to the E/O engine, the interior circuit board, or both.

Accordingly, there is a need for a pluggable connector that provides desirable heat transfer while minimizing a likelihood of damage to internal electronics, such as an E/O engine and/or interior circuit board.

BRIEF DESCRIPTION

In an embodiment, a pluggable connector is provided that includes a connector housing having a leading end configured to mate with a receptacle assembly. The connector housing has an interior cavity. The pluggable connector also includes a communication assembly held by the connector housing. The communication assembly includes internal electronics located within the interior cavity, and a mating terminal located proximate to the leading end. The mating terminal is communicatively coupled to the internal electronics. The pluggable connector also includes a thermal-transfer assembly that is disposed within the interior cavity. The thermal-transfer assembly includes first and second thermal-transfer modules that each include a plurality of spaced-apart projections. The projections of the first and second thermal-transfer modules are interleaved with one another. The first thermal-transfer module is coupled to the internal electronics, and the second thermal-transfer module is coupled to the connector housing such that the first and second thermal-transfer modules form a thermal-transfer path between the internal electronics and the connector housing.

In some embodiments, each of the first and second thermal-transfer modules includes a base that joins the corresponding projections. The projections of the first thermal-transfer module extend from the corresponding base in a first direction, and the projections of the second thermal-transfer module extend from the corresponding base in a second direction that is opposite the first direction. Optionally, the projections of the first and second thermal-transfer modules extend to corresponding distal ends. The distal ends of the first thermal-transfer module may be spaced apart from the base of the second thermal-transfer module, and the distal ends of the second thermal-transfer module may be spaced apart from the base of the first thermal-transfer module.

In some embodiments, the projections of the first and second thermal-transfer modules form tolerance gaps therebetween when interleaved with one another. Each of the tolerance gaps extends between a corresponding projection of the first thermal-transfer module and a corresponding projection of the second thermal-transfer module. Optionally, the tolerance gaps may be less than 0.200 millimeters.

In an embodiment, a plug assembly is provided that includes a pluggable connector including a connector housing having a leading end and a trailing end. The leading end is configured to mate with a receptacle assembly. The connector housing has an interior cavity between the leading and trailing ends. The pluggable connector also includes internal electronics located within the interior cavity. The plug assembly also includes a communication cable that is coupled to the trailing end. The communication cable is configured to transmit data signals to the internal electronics or transmit data signals from the internal electronics. The pluggable connector also includes a thermal-transfer assembly that is disposed within the interior cavity. The thermal-transfer assembly includes first and second thermal-transfer modules that each include a plurality of spaced-apart projections. The projections of the first and second thermal-transfer modules are interleaved with one another. The first thermal-transfer module is coupled to the internal electronics, and the second thermal-transfer module is coupled to the connector housing such that the first and second thermal-transfer modules form a thermal-transfer path between the internal electronics and the connector housing.

BRIEF DESCRIPTION OF THE DRAWINGS

FIG. 4 illustrates an enlarged cross-sectional view of a first thermal-transfer module formed in accordance with an embodiment that may be used with the pluggable connector of FIG. 2.

FIG. 5 illustrates the first thermal-transfer module of FIG. 4 engaged or mated with a second thermal-transfer module to form a thermal-transfer path within the pluggable connector of FIG. 2.

DETAILED DESCRIPTION

Figure 1:
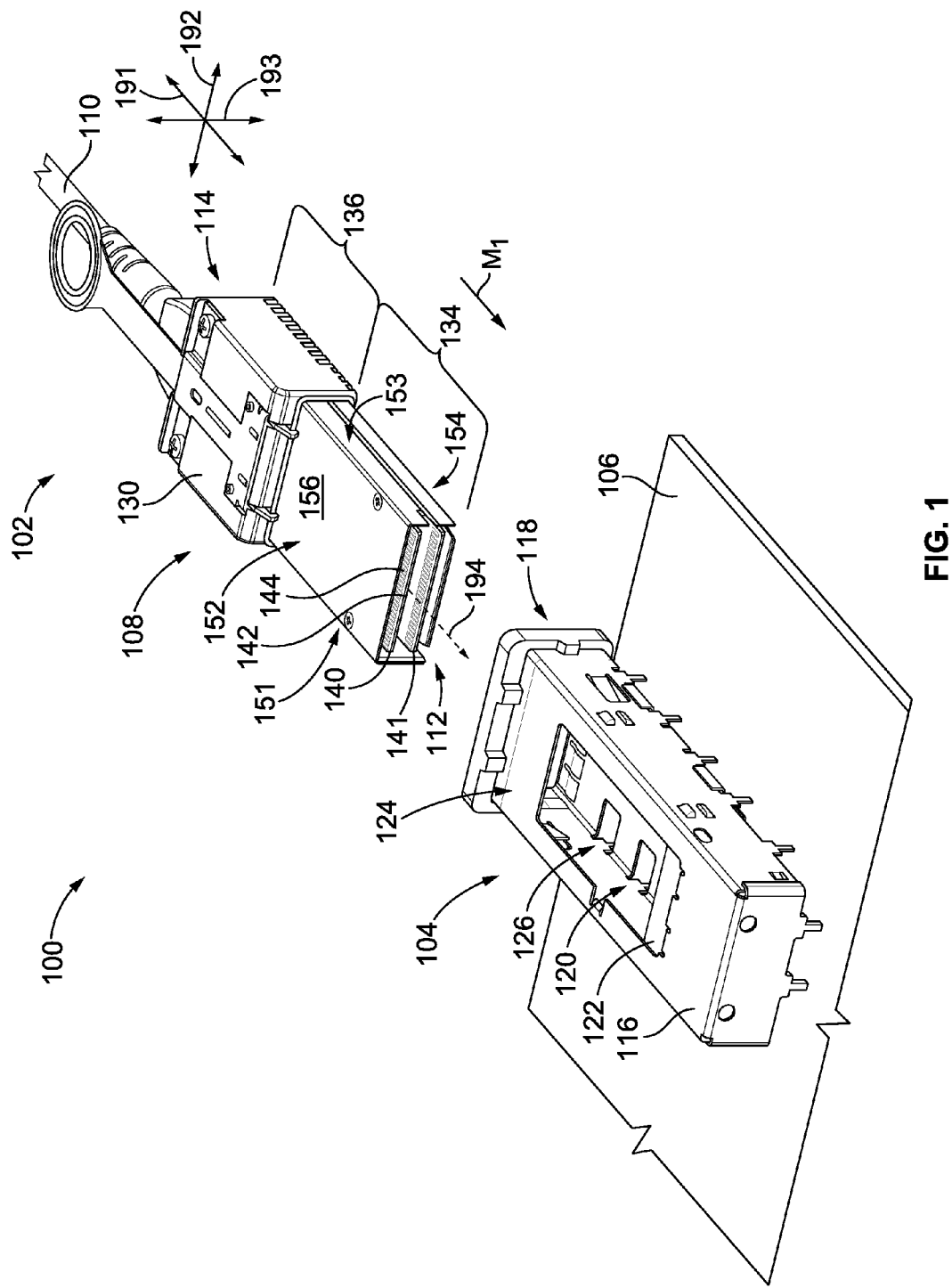
FIG. 1 is a perspective view of a plug and receptacle assembly formed in accordance with an embodiment.

FIG. 1 is a perspective view of a plug and receptacle assembly 100 formed in accordance with an embodiment that includes a plug assembly 102 and a receptacle assembly 104. The plug and receptacle assembly 100 may also be referred to as a communication system, and the plug assembly 102 may also be referred to as a cable assembly. The receptacle assembly 104 is mounted to a circuit board 106. The circuit board 106 may be, for example, a daughter card or a mother board. In the illustrated embodiment, the plug assembly 102 includes a pluggable connector 108 that is an input/output (I/O) module capable of repeatedly engaging the receptacle assembly 104. In FIG. 1, the plug and receptacle assembly 100 is oriented with respect to mutually perpendicular axes, including a mating axis 191, a lateral axis 192, and an elevation axis 193. Although the elevation axis 193 appears to extend parallel to the force of gravity in FIG. 1 with gravity pulling the receptacle assembly 104 toward the circuit board 106, it is understood that the plug and receptacle assembly 100 and its components may have other spatial orientations. For example, the lateral axis 192 may extend parallel to the force of gravity.

The plug assembly 102 includes a communication cable 110 that is coupled to a trailing end 114 of the pluggable connector 108. Although not shown, the plug assembly 102 may include another pluggable connector 108 that is attached to an opposite end of the communication cable 110. The pluggable connector 108 has a leading end 112 that is opposite the trailing end 114. A central axis 194 of the pluggable connector 108 extends between the leading end 112 and the trailing end 114.

The receptacle assembly 104 has a receptacle housing 116. In some embodiments, the receptacle housing 116 may be stamped and formed from sheet metal to form a receptacle cage. In other embodiments, the receptacle housing 116 may be formed from other manufacturing methods. The receptacle housing 116 defines a communication port 118 that provides access to a housing cavity 120 within the receptacle housing 116. The communication port 118 and the housing cavity 120 are configured to receive a portion of the pluggable connector 108. For example, the leading end 112 of the pluggable connector 108 is configured to be inserted through the communication port 118 and into the housing cavity 120.

To insert the leading end 112 into the housing cavity 120, the pluggable connector 108 is aligned with respect to the communication port 118 and the housing cavity 120 and advanced through the communication port 118 in a mating direction $M_1$. The mating direction $M_1$ is parallel to the mating axis 191. The leading end 112 is advanced toward a mating connector 122 that is disposed within the housing cavity 120. The pluggable connector 108 and the mating connector 122 form a pluggable engagement.

Optionally, the receptacle assembly 104 includes a thermal-transfer module (not shown) that is configured to engage the pluggable connector 108 when the pluggable connector 108 is mated with the receptacle assembly 104 and disposed within the housing cavity 120. For instance, the receptacle housing 116 has a top side 124 that includes an opening 126 therethrough. In some embodiments, the thermal-transfer module may be mounted to the top side 124 and extend along the opening 126. The thermal-transfer module may have a surface (not shown) that engages the pluggable connector 108 when the pluggable connector 108 is positioned within the housing cavity 120. As such, the thermal-transfer module may absorb thermal energy generated by the pluggable connector 108.

The communication cable 110 is configured to transmit data signals therethrough and, optionally, electrical power. In alternative embodiments, the communication cable 110 may only transmit electrical power. In an exemplary embodiment, the communication cable 110 includes optical fibers that are configured to transmit data signals in the form of optical signals. The optical fibers may be communicatively coupled to internal electronics 128 (shown in FIG. 2) of the pluggable connector 108, such as an electro-optical (E/O) engine, integrated circuits, processing units, or other circuitry. In other embodiments, the communication cable 110 includes insulated wires having jackets that surround wire conductors. The wire conductors may be configured to transmit electrical signals and/or electrical power.

In particular embodiments, the plug and receptacle assembly 100 is a high speed pluggable input/output (I/O) interconnect assembly. The plug and receptacle assembly 100, the plug assembly 102, and/or the pluggable connector 108 may be configured for various applications. Non-limiting examples of such applications include storage networking, cluster computing, high performance computing, and telecommunications. The plug and receptacle assembly 100, the plug assembly 102, and/or the pluggable connector 108 may be used with switches, hubs, storage systems, storage devices, adapters, controllers, network interface cards (NICs), servers, switches, host bus adapters (HBAs), and routers. By way of one example, the pluggable connector 108 and/or the receptacle assembly 104 may be part of a quad small form-factor pluggable (QSFP) interconnect system, such as the QSFP+ system available from TE Connectivity. As another example, the pluggable connector 108 and/or the receptacle assembly 104 may be part of a CDFP interconnect system, which is a standard developed through a multi-source agreement. The plug and receptacle assembly 100 may be capable of achieving high data rates, such as data rates that exceed 20 gigabits per second (Gbps), 50 Gbps, 100 Gbps, or more. The plug and receptacle assembly 100 may also be configured to satisfy various industry standards, such as Ethernet, Fibre Channel, and InfiniBand.

In other embodiments, the plug and receptacle assembly 100 may transmit data at slower speeds. Yet in other embodiments, the pluggable connector 108 may not transit data signals. Instead, the pluggable connector 108 may only transmit electrical power.

The pluggable connector 108 has a connector housing 130 that includes the leading end 112 and the trailing end 114. The connector housing 130 forms an interior cavity 132 (shown in FIG. 2) where the internal electronics 128 (FIG. 2) are located. The interior cavity 132 extends between the leading end 112 and the trailing end 114 and may open to the leading end 112. The connector housing 130 has a plug portion 134 that is sized and shaped to be inserted through the communication port 118 and into the housing cavity 120 of the receptacle assembly 104. The connector housing 130 also includes a body portion 136 that is not inserted into the housing cavity 120. The plug portion 134 includes the leading end 112. In an exemplary embodiment, the plug portion 134 includes the internal electronics 128 and a thermal-transfer assembly 160 (shown in FIG. 2) that transfers heat generated by the internal electronics 128 to an exterior surface 156 of the connector housing 130. In other embodiments, the body portion 136 may include the internal electronics 128 and/or the thermal-transfer assembly 160. The body portion 136 includes the trailing end 114 and may be configured to be gripped by an individual.

The pluggable connector 108 includes a pair of circuit boards 140, 141 that each have a board edge 142 with mating terminals 144. In alternative embodiments, the pluggable connector 108 may have only one circuit board or may not include a circuit board. In an exemplary embodiment, the mating terminals 144 are electrical contacts or, more specifically, contact pads. The circuit boards 140, 141 are disposed within the interior cavity 132 (FIG. 2) and exposed at the leading end 112. The mating terminals 144 are configured to engage corresponding terminals (not shown) of the mating connector 122 in the receptacle assembly 104. The mating terminals 144 may be other types of electrical contacts, such as contact beams, in other embodiments The plug portion 134 of the connector housing 130 includes plug sides 151, 152, 153, 154 that extend parallel to the central axis 194 and between the leading and trailing ends 112, 114. The plug sides 151, 153 face in opposite directions along the lateral axis 192 and extend longitudinally along the mating axis 191 between the body portion 136 and the leading end 112. The plug sides 152, 154 face in opposite directions along the elevation axis 193 and extend longitudinally along the mating axis 191 between the body portion 136 and the leading end 112. The plug sides 152, 154 extend laterally between the plug sides 151, 153. When the pluggable connector 108 is mated with the receptacle assembly 104, the thermal-transfer module (not shown) of the receptacle assembly 104 may engage the exterior surface 156 along the plug side 152. As described below, the thermal-transfer assembly 160 (FIG. 2) may thermally couple the exterior surface 156 along the plug side 152 to the internal electronics 128 (FIG. 2).

Figure 2:
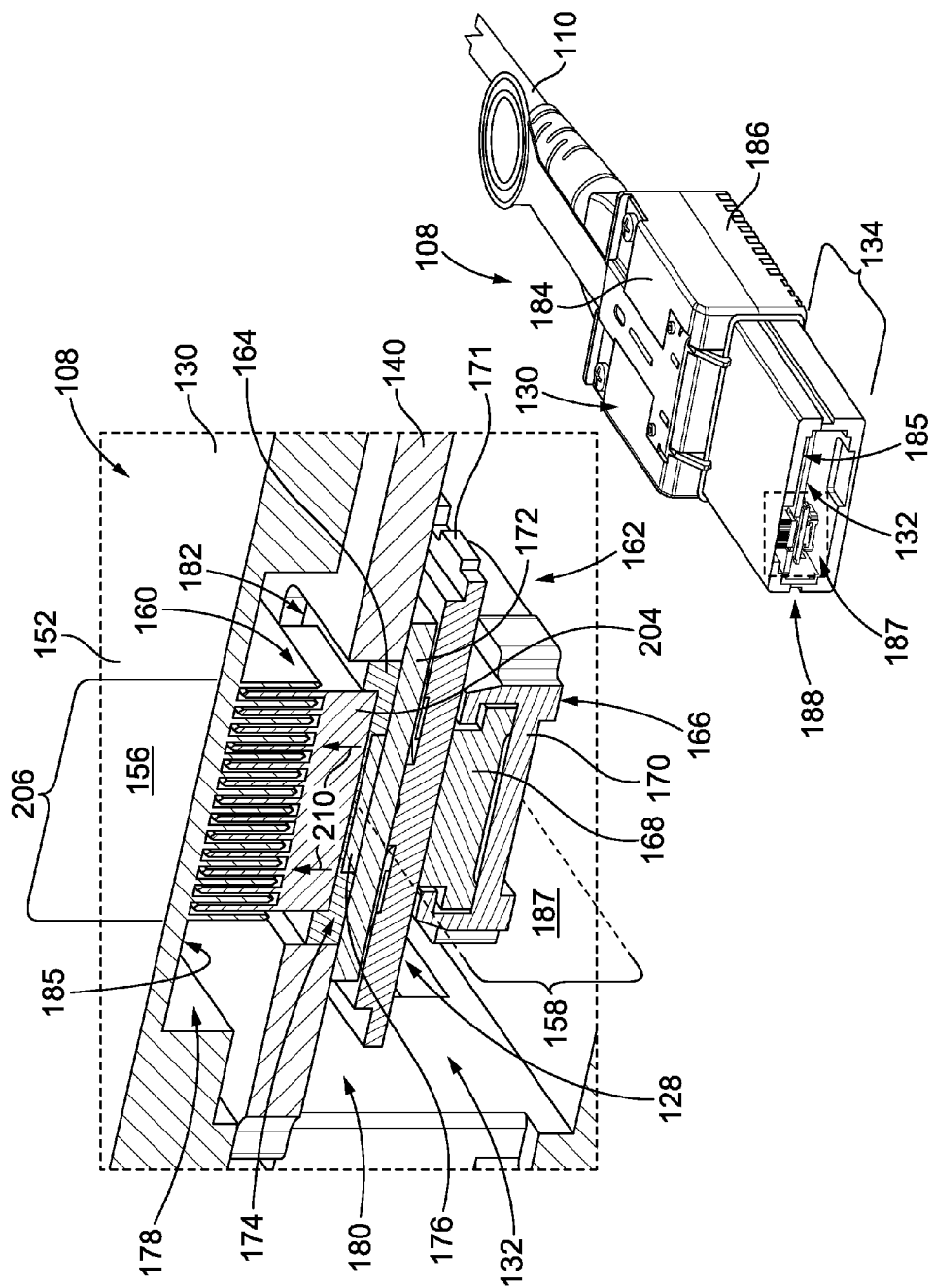
FIG. 2 is a cut-away view of a pluggable connector formed in accordance with one embodiment that may be used with the plug and receptacle assembly of FIG. 1.

FIG. 2 includes a perspective cut-away view of the pluggable connector 108 with a section of the plug portion 134 removed to show internal components of the pluggable connector 108. The connector housing 130 may be formed from multiple housing shells. For example, the connector housing 130 is formed from first and second housing shells 184, 186 that are joined together along an interface or seam 188. The interior cavity 132 is defined between the first and second housing shells 184, 186. The first and second housing shells 184, 186 may include respective interior surfaces 185, 187 that at least partially define the interior cavity 132 within the plug portion 134.

FIG. 2 also includes an enlarged view of the pluggable connector 108 that shows the interior cavity 132 in greater detail. The pluggable connector 108 has a communication assembly (or sub-assembly) 162 that is configured to receive data and/or electrical power through the communication cable 110. The communication assembly 162 is disposed within the interior cavity 132. In an exemplary embodiment, the communication assembly 162 includes the circuit board 140, the circuit board 141 (FIG. 1), and the internal electronics 128. For illustrative purposes, the circuit board 141 is not shown in FIG. 2. At least a portion of the communication assembly 162 may be positioned outside of the interior cavity 132 or exposed to an exterior of the pluggable connector 108. For example, the mating terminals 144 (FIG. 1) may be part of the communication assembly 162 and may be exposed to the exterior of the pluggable connector 108 at the leading end 112 (FIG. 1).

The internal electronics 128 may include electrical circuits and/or devices through which current propagates. The internal electronics 128 may generate a substantial amount of heat during operation of the pluggable connector 108. For example, the internal electronics 128 may include lasers and/or circuitry, such as integrated circuits or other circuitry that may process data signals.

In some embodiments, the internal electronics 128 includes an E/O engine 158. In an exemplary embodiment, the E/O engine 158 may be similar to the Coolbit™ optical engine developed by TE Connectivity. The E/O engine 158 is configured to convert data signals between an electrical signal form and an optical signal form. As such, the E/O engine 158 may also be referred to as a signal converter. As shown in FIG. 2, the E/O engine 158 includes an optical connector 166 that is communicatively coupled to optical fibers (not shown) of the communication cable 110. The optical connector 166 includes a light-transmitting module 168 and a module housing 170 that surrounds the light-transmitting module 168. The light-transmitting module 168 may receive optical signals from the optical fibers or receive optical signals from light generators of the E/O engine 158, such as vertical-cavity surface-emitting lasers (VCSELs) (not shown). The light-transmitting module 168 may direct the optical signals to different portions of the E/O engine 158.

The E/O engine 158 also includes a base structure 171, an interconnecting carrier 172, and processing circuitry 174. The base structure 171 and the interconnecting carrier 172 are positioned between the optical connector 166 and the processing circuitry 174. The base structure 171 and the interconnecting carrier 172 may have conductive pathways and/or optical pathways therethrough to operably couple the optical connector 166 and the processing circuitry 174. In an exemplary embodiment, the interconnecting carrier 172 includes glass, but other materials may be used. The processing circuitry 174 may include one or more processing units 176 and an encapsulant 164 that surrounds the processing units 176. Each of the processing units 176 is configured to receive input data signals and process the input data signals in a predetermined manner to provide output data signals. Non-limiting examples of processing units that may be used in the E/O engine 158 may include integrated circuits, laser drivers, amplifiers (such as transimpedance amplifiers (TIAs)), or other electrical circuitry.

As shown in FIG. 2, the circuit board 140 may separate the interior cavity 132 into cavity regions 178, 180. The cavity region 178 is located between the circuit board 140 and the interior surface 185 of the first housing shell 184. The cavity region 180 is located between the circuit board 140 and the interior surface 187 of the second housing shell 186. Although not shown, the circuit board 141 (FIG. 1) may extend through the interior cavity 132 and divide the cavity region 180 into separate cavity regions such that a cavity region exists between the circuit boards 140, 141.

The E/O engine 158 is coupled to the circuit board 140. In the illustrated embodiment, the E/O engine 158 is substantially disposed within the cavity region 180 such that an entirety or almost an entirety of the E/O engine 158 is positioned within the cavity region 180. In other embodiments, however, the E/O engine 158 may be disposed within the cavity region 178 or within both of the cavity regions 178, 180. Also shown, the circuit board 140 may include a board window 182. The E/O engine 158 may be coupled to the circuit board 140 such that the E/O engine 158 extends across and covers at least a portion of the board window 182.

Embodiments set forth herein may include a thermal-transfer assembly disposed within the pluggable connector. For example, the pluggable connector 108 includes the thermal-transfer assembly 160 disposed within the interior cavity 132. The thermal-transfer assembly 160 includes a first thermal-transfer module or component 204 and a second thermal-transfer module or component 206. The first and second thermal-transfer modules 204, 206 are thermally coupled to each other such that the first and second thermal-transfer modules 204, 206 form a thermal-transfer path (indicated by the arrows 210) between the internal electronics 128 and a portion of the connector housing 130. For example, in the illustrated embodiment, the thermal-transfer path 210 extends from the internal electronics 128 to a portion of the exterior surface 156 along the plug side 152. In other embodiments, the thermal-transfer path 210 may extend to different portions of the connector housing 130. The exterior surface 156 of the connector housing 130 may permit the thermal energy to dissipate therefrom. For example, as described above, the exterior surface 156 may engage a thermal-transfer module (not shown) of the receptacle assembly 104 (FIG. 1) that absorbs thermal energy from the exterior surface 156.

The first and second thermal-transfer modules 204, 206 may comprise a material having a suitable thermal conductivity for transferring heat away from the interior cavity 132 or, more specifically, the internal electronics 128 disposed within the interior cavity 132. The material may be, for example, a metal or polymer with metal fibers. During operation of the pluggable connector 108, thermal energy generated by the internal electronics 128 may be absorbed by the first thermal-transfer module 204 and conveyed to the second thermal-transfer module 206.

Figure 3:
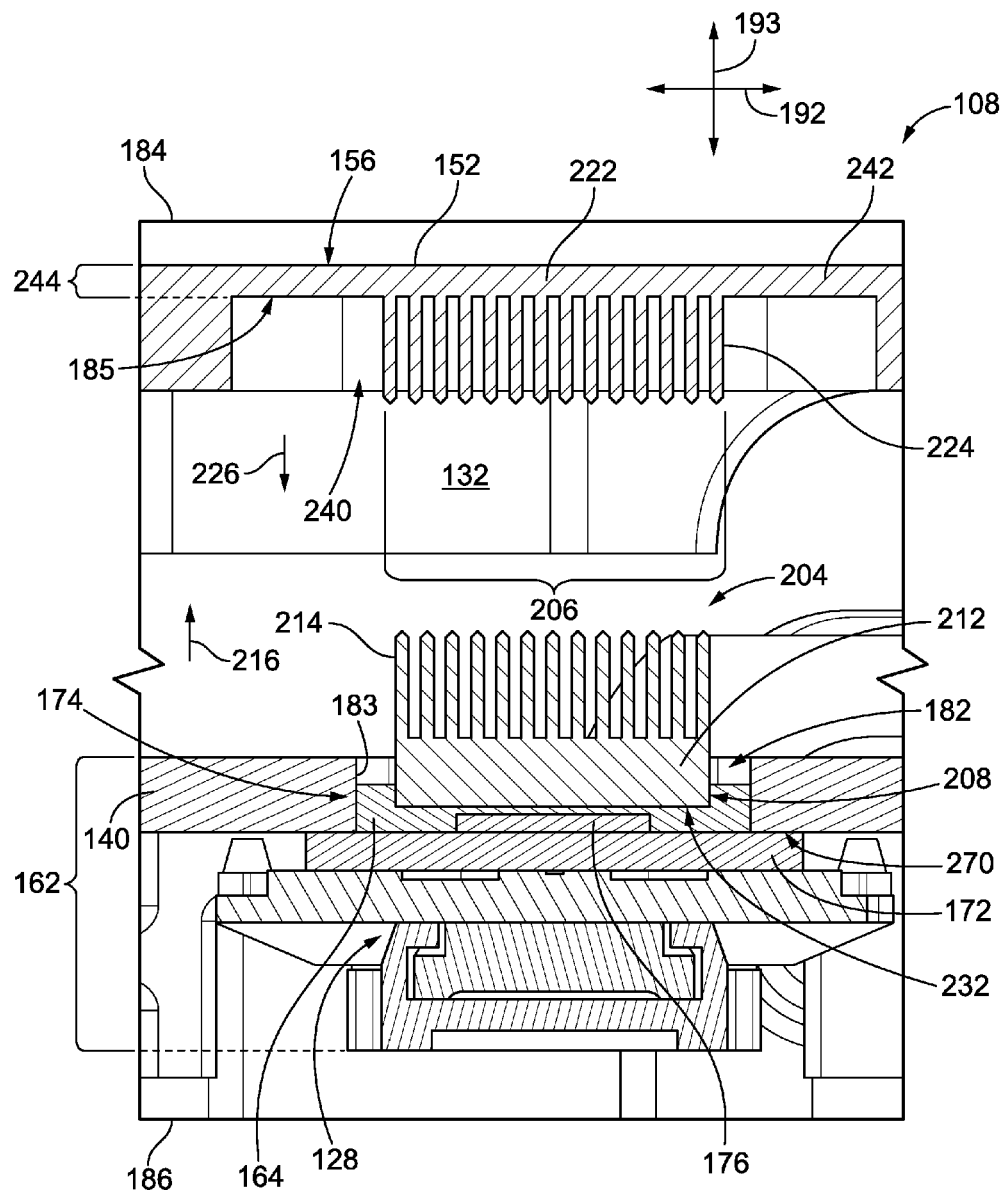
FIG. 3 illustrates an enlarged cross-sectional view of the pluggable connector of FIG. 2 in which a pair of housing shells of the pluggable connector are separated.

FIG. 3 is an enlarged cross-section of the pluggable connector 108 showing the first housing shell 184 separated from the second housing shell 186. The communication assembly 162 is coupled to the second housing shell 186. As shown, the first thermal-transfer module 204 includes a base 212 and projections 214 that are coupled to and extend away from the base 212. The projections 214 are spaced-apart from one another along the lateral axis 192 and extend away from the base 212 in a first direction 216 along the elevation axis 193. The second thermal-transfer module 206 includes a base 222 and projections 224 that are coupled to and extend away from the base 222. Like the projections 214, the projections 224 are spaced-apart from one another along the lateral axis 192. The projections 224 extend away from the base 222 in a second direction 226 along the elevation axis 193 that is opposite the first direction 216. As described below, the projections 214, 224 of the first and second thermal-transfer modules 204, 206, respectively, are dimensioned and positioned relative to one another such that the projections 214, 224 are interleaved with one another to form a thermal coupling that is sufficient for conveying thermal energy therethrough.

The first thermal-transfer module 204 is positioned adjacent to the processing unit 176 to absorb thermal energy therefrom. As described above, the processing circuitry 174 may include more than one processing unit 176. In such instances, the first thermal-transfer module 204 may extend adjacent to each of the processing units 176 or, alternatively, more than one thermal-transfer module may be used. In some embodiments, the first thermal-transfer module 204 is directly connected to the encapsulant 164 that surrounds the processing unit 176. The encapsulant 164 may include a moldable material that is deposited and shaped over the processing unit 176 to connect the thermal-transfer module 204 to the processing unit 176. In some embodiments, the encapsulant 164 forms a seating space 208 that is shaped to receive a portion of the base 212. The base 212 includes an outer base surface or underside 232 that is directly coupled to the encapsulant 164 and positioned immediately adjacent to the processing unit 176 in order to absorb and convey the thermal energy therefrom.

In the illustrated embodiment, the processing circuitry 174 and the first thermal-transfer module 204 are positioned within the board window 182. The processing circuitry 174 or, more specifically, the encapsulant 164 may engage an inner edge 183 that defines the board window 182 and at least partially fill the board window 182 therein. Also shown, the interconnecting carrier 172 may directly engage a board surface 270 of the circuit board 140. For example, an adhesive may be used to directly secure the interconnecting carrier 172 to the board surface 270. In some embodiments, the encapsulant 164 may also facilitate coupling the processing circuitry 174 to the circuit board 140. In other embodiments, only one of the processing circuitry 174 or the first thermal-transfer module 204 are positioned within the board window 182.

In the illustrated embodiment, the second thermal-transfer module 206 is formed from the first housing shell 184. For example, the base 222 may include a portion of the plug side 152 and the exterior surface 156. The first housing shell 184 includes the interior surface 185, which may be shaped to form a recess 240 and the projections 224. The first housing shell 184 includes a separating wall 242 that separates the interior cavity 132 from the exterior of the pluggable connector 108. The separating wall 242 may include or form the base 222. For example, the separating wall 242 may have a thickness 244 that is measured between the interior surface 185 and the exterior surface 156. The recess 240 may be configured to reduce the thickness 244 of the separating wall 242 to sufficiently convey thermal energy therethrough.

In some embodiments, the communication assembly 162 is positioned within and coupled to the second housing shell 186. The first housing shell 184 may be lowered onto the second housing shell 186 and coupled thereto along the interface 188 (FIG. 2) thereby surrounding the communication assembly 162 and, more specifically, the internal electronics 128. As the first housing shell 184 is coupled to the second housing shell 186, the projections 214, 224 of the first and second thermal-transfer modules 204, 206, respectively, interleave with one another.

FIG. 4 illustrates an enlarged cross-section of the first thermal-transfer module 204. The base 212 includes base surface portions 252 that may be opposite the outer base surface 232 (FIG. 3). Each of the base surface portions 252 extends between and joins two adjacent projections 214. The projections 214 extend from the corresponding base surface portions 252 to the respective distal ends or edges 218. Each of the projections 214 has a projection height 260 that extends from the base surface portion 252 to the corresponding distal end 218. For embodiments in which the projections 214 are plates, the distal ends 218 may be referred to as distal edges. In an exemplary embodiment, the projections 214 are separated from each other by respective receiving spaces 250. Each of the base surface portions 252 partially defines a corresponding receiving space 250. For embodiments in which the projections 214 are plates, the receiving spaces 250 may be referred to as receiving slots.

Each of the projections 214 may have side surfaces 256, 258 that face in opposite directions and define a projection width 262 of the corresponding projection 214 therebetween. The side surface 256 of one projection 214 may face the side surface 258 of another projection 214 (or vice versa) to define the corresponding receiving space 250 therebetween. In an exemplary embodiment, all of the projections 214 have a same projection height 260 and a same projection width 262. When two components have the same height (or other dimension), the two components may be described as having a common height (or other dimension). In other embodiments, the projections 214 may have respective different dimensions.

The receiving space 250 has a receiving width 266 between adjacent projections 214 that may be less than three times (3×) the projection width 262 of either one of the adjacent projections 214. In particular embodiments, the receiving width 266 of the receiving space 250 may be less than two times (2×) the projection width 262 of either one of the adjacent projections 214. In more particular embodiments, the receiving width 266 may be less than one and a half times (1.5×) the projection width 262 of either one of the adjacent projections 214. By way of example, the projection width 262 may be at most 3.0 mm or, more specifically, at most 2.0 mm. In more particular embodiments, the projection width 262 may be at most 1.5 mm, at most 1.0 mm, at most 0.50 mm, at most 0.30 mm, or, more particularly, at most 0.15 mm. The projection height 260 may be at most 20.0 mm or, more specifically, at most 15.0 mm. In more particular embodiments, the projection height 260 may be at most 10.0 mm, at most 5.0 mm, or, more specifically, at most 2.0 mm. The aforementioned dimensions are merely examples and other dimensions may be used.

FIG. 5 is an enlarged cross-sectional view of the first and second thermal-transfer modules 204, 206 in a mated position such that the projections 214, 224 are interleaved with one another. In some embodiments, the second thermal-transfer module 206 has a similar shape as the first thermal-transfer module 204. For example, the second thermal-transfer module 206 has base surface portions 276 that may be opposite the exterior surface 156 (FIG. 3) and be formed by from the interior surface 185 (FIG. 3). Each of the projections 224 has a projection height 280 that extends from the corresponding base surface portion 276 to a corresponding distal end 278 of the projection 224. Each of the projections 224 also has a projection width 282 that extends between opposite side surfaces 292, 294 of the corresponding projection 224. In the illustrated embodiment, all of the projections 224 have a same projection height 280 and a same projection width 282. In other embodiments, the projections 224 and/or the projections 214 may have respective different dimensions.

Similar to the first thermal-transfer module 204, the second thermal-transfer module 206 has receiving spaces 296 between adjacent projections 224. The receiving space 296 may have a receiving width 286 that is less than three times (3×) the projection width 282 of either one of the adjacent projections 224 that define the respective receiving space 296. In particular embodiments, the receiving width 286 may be less than two times (2×) the projection width 282 of either one of the adjacent projections 224. In more particular embodiments, the receiving width 286 may be less than one and a half times (1.5×) the projection width 282 of either one of the adjacent projections 224. By way of example, the projection width 282 may be at most 3.0 mm or, more specifically, at most 2.0 mm. In more particular embodiments, the projection width 282 may be at most 1.5 mm, at most 1.0 mm, at most 0.50 mm, at most 0.30 mm, or, more particularly, at most 0.15 mm. The projection height 280 may be at most 20.0 mm or, more specifically, at most 15.0 mm. In more particular embodiments, the projection height 280 may be at most 10.0 mm, at most 5.0 mm, or, more specifically, at most 2.0 mm. Again, the above dimensions are merely examples and other dimensions may be used.

As shown in FIG. 5, when the projections 214, 224 are interleaved, the projections 214 are positioned within corresponding receiving spaces 296 and the projections 224 are positioned within corresponding receiving spaces 250. The first and second thermal-transfer modules 204, 206 may form a relatively snug fit such that the interleaved projections 214, 224 form tolerance gaps 298 therebetween. In some embodiments, the projection widths 262, 282 are configured to accommodate for tolerances in the manufacturing and assembly of the pluggable connector 108 (FIG. 1) to decrease the likelihood that the projections 214, 224 will interfere with each other during mating of the first and second thermal-transfer modules 204, 206, and also to provide effective heat transfer therebetween when the first and second thermal-transfer modules 204, 206 are mated. Each tolerance gap 298 extends between a corresponding projection 214 and a corresponding projection 224 along the lateral axis 192. In some embodiments, the tolerance gaps 298 may be less than 0.200 millimeters (mm) or 200 microns. In certain embodiments, the tolerance gaps 298 may be less than 0.100 mm or 100 microns. In particular embodiments, the tolerance gaps 298 may be less than 0.075 mm or 75 microns or, more particularly, less than 0.050 mm or 50 microns.

Compared to plug and receptacle assemblies that utilize heat blocks, embodiments set forth herein may provide a larger contact area between the first and second thermal-transfer modules. For instance, the planar surfaces of known heat blocks engage each other along a contact area that extends along only two dimensions. Embodiments set forth herein, however, include first and second thermal-transfer modules that engage each other along three dimensions. Thus, the interleaved projections 214, 224 may form a collective contact area that is much greater than the contact area between flat heat blocks. As such, embodiments may be capable of greater amounts of heat transfer.

In some cases, embodiments may achieve greater amounts of heat transfer without providing a normal force that presses against the circuit board 140 (FIG. 1) and/or the internal electronics 128 (FIG. 2). For example, although the first and second thermal-transfer modules 204, 206 may be mated for heat transfer as described above, the first and second thermal-transfer modules 204, 206 may not provide or exert a substantial force in a direction along the elevation axis 193. For instance, as shown in FIG. 5, the distal ends 218 are spaced apart from the corresponding base surface portions 276 by a tolerance gap 297. along the elevation axis 193, and the distal ends 278 are spaced apart from the corresponding base surface portions 252 by a tolerance gap 295 along the elevation axis 193. In some embodiments, the projection heights 260, 280 are configured to accommodate for tolerances in the manufacturing and assembly of the corresponding pluggable connector to minimize the likelihood that the distal ends 218, 278 will engage the base surface portions 276, 252, respectively. As such, the first and second thermal-transfer modules 204, 206 will not exert a normal force on each other.

Figure 6:
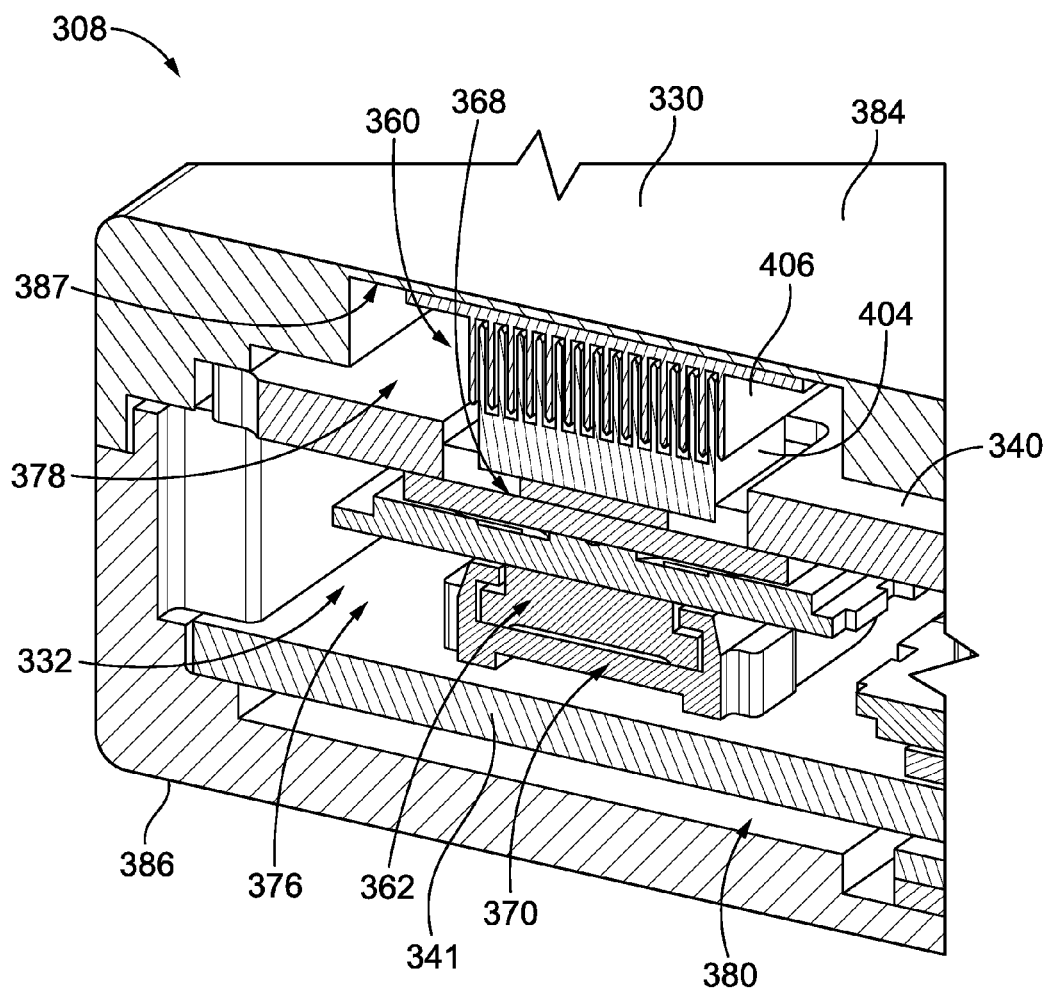
FIG. 6 is a cut-away view of a pluggable connector formed in accordance with an embodiment that may be used with the plug and receptacle assembly of FIG. 1.

FIG. 6 is a cut-away view of a pluggable connector 308 formed in accordance with an embodiment that may be used with a plug and receptacle assembly, such as the plug and receptacle assembly 100 of FIG. 1. The pluggable connector 308 may include similar components and features as the pluggable connector 108 (FIG. 1). For example, the pluggable connector 308 includes a connector housing 330 that includes first and second housing shells 384, 386. The pluggable connector 308 also includes a thermal-transfer assembly 360 that includes first and second thermal-transfer modules 404, 406. Unlike the pluggable connector 108, however, the second thermal-transfer module 406 is discrete with respect to the first housing shell 384. Instead of being formed from the first housing shell 384, the second thermal-transfer module 406 may be secured to an interior surface 387 of the first housing shell 384 using, for example, a thermally conductive adhesive. The first and second thermal-transfer modules 404, 406 may be similar to the first and second thermal-transfer modules 204, 206 (FIG. 2) and engage or mate with each other in a similar manner.

FIG. 6 also illustrates a pair of circuit boards 340, 341 within an interior cavity 332 of the connector housing 330. As shown, the circuit board 340, 341 separate the interior cavity 332 into an inner cavity region 376 and outer cavity regions 378, 380. The pluggable connector 308 includes a communication assembly 362 that includes internal electronics 368 capable of generating heat during operation of the pluggable connector 308. In the illustrated embodiment, the internal electronics 368 include an E/O engine 370 that may be identical to the E/O engine 158 (FIG. 2). As shown, the E/O engine 370 is substantially disposed within the inner cavity region 376 between the circuit boards 340, 341.

The pluggable connector 108 (FIG. 1) and the pluggable connector 308 (FIG. 6) include thermal-transfer modules having projections that are plates. In other embodiments, the projections may not be plates. For example, the projections may be posts or pins that project from the corresponding base. In such embodiments, the post of one thermal-transfer module may be positioned between adjacent posts of the other thermal-transfer module. In this manner, the posts may be engaged such that a thermal-transfer path sufficient for conveying the thermal energy away from the internal electronics may be formed.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The patentable scope should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112(f), unless and until such claim limitations expressly use the phrase "means for" followed by a statement of function void of further structure.

What is claimed is:

1. A pluggable connector comprising:
a connector housing having a leading end that is configured to mate with a receptacle assembly, the connector housing having an interior cavity;
a communication assembly held by the connector housing, the communication assembly including internal electronics located within the interior cavity and a mating terminal located proximate to the leading end, the mating terminal being communicatively coupled to the internal electronics; and
a thermal-transfer assembly disposed within the interior cavity, the thermal-transfer assembly including first and second thermal-transfer modules that each include a plurality of spaced-apart projections, wherein the corresponding projections of the first and second thermal-transfer modules are interleaved with one another, the first thermal-transfer module being coupled to the internal electronics and the second thermal-transfer module being coupled to the connector housing such that the first and second thermal-transfer modules form a thermal-transfer path between the internal electronics and the connector housing.

2. The pluggable connector of claim 1, wherein each of the first and second thermal-transfer modules includes a base that joins the corresponding projections, the projections of the first thermal-transfer module extending from the corresponding base in a first direction, the projections of the second thermal-transfer module extending from the corresponding base in a second direction that is opposite the first direction.

3. The pluggable connector of claim 2, wherein the corresponding projections of the first and second thermal-transfer modules extend to corresponding distal ends, the distal ends of the first thermal-transfer module being spaced apart from the base of the second thermal-transfer module and the distal ends of the second thermal-transfer module being spaced apart from the base of the first thermal-transfer module.

4. The pluggable connector of claim 1, wherein the corresponding projections of the first and second thermal-transfer modules form tolerance gaps therebetween when interleaved with one another, each of the tolerance gaps extending between a corresponding projection of the first thermal-transfer module and a corresponding projection of the second thermal-transfer module, the tolerance gaps being less than 0.200 millimeters.

5. The pluggable connector of claim 1, wherein the corresponding projections of the first and second thermal-transfer modules include plates.

6. The pluggable connector of claim 1, wherein the internal electronics include an electro-optical (E/O) engine that transforms data signals between an electrical signal form and an optical signal form.

7. The pluggable connector of claim 6, wherein the first thermal-transfer module is directly coupled to the E/O engine.

8. The pluggable connector of claim 6, wherein the E/O engine includes at least one processing unit.

9. The pluggable connector of claim 1, wherein the connector housing includes a plurality of housing shells, the second thermal-transfer module being secured to one of the housing shells or formed from one of the housing shells.

10. The pluggable connector of claim 1, wherein the communication assembly includes a circuit board having a board edge, the mating terminal being positioned along the board edge.

11. The pluggable connector of claim 1, wherein the mating terminal includes an array of mating terminals positioned along the board edge.

12. The pluggable connector of claim 1, wherein the communication assembly includes a circuit board and the internal electronics include a processing unit coupled to the circuit board, the circuit board having a board window therethrough, wherein the first thermal-transfer module is disposed within the board window and positioned to absorb thermal energy from the processing unit.

13. A plug assembly comprising:
- a pluggable connector including a connector housing having a leading end configured to mate with a receptacle assembly, the connector housing having an interior cavity, the pluggable connector also including internal electronics located within the interior cavity; and
- a communication cable coupled to the connector housing and communicatively coupled to the internal electronics, the communication cable configured to transmit at least one of data signals or electrical power;
- wherein the pluggable connector also includes a thermal-transfer assembly that is disposed within the interior cavity, the thermal-transfer assembly including first and second thermal-transfer modules that each include a plurality of spaced-apart projections, wherein the corresponding projections of the first and second thermal-transfer modules are interleaved with one another, the first thermal-transfer module being coupled to the internal electronics and the second thermal-transfer module being coupled to the connector housing such that the first and second thermal-transfer modules form a thermal-transfer path between the internal electronics and the connector housing.

14. The plug assembly of claim 13, wherein each of the first and second thermal-transfer modules includes a base that joins the corresponding projections, the projections of the first thermal-transfer module extending from the corresponding base in a first direction, the projections of the second thermal-transfer module extending from the corresponding base in a second direction that is opposite the first direction.

15. The plug assembly of claim 13, wherein the corresponding projections of the first and second thermal-transfer modules form tolerance gaps therebetween when interleaved with one another, each of the tolerance gaps extending between a corresponding projection of the first thermal-transfer module and a corresponding projection of the second thermal-transfer module, the tolerance gaps being less than 0.200 millimeters.

16. The plug assembly of claim 13, wherein the corresponding projections of the first and second thermal-transfer modules include plates.

17. The plug assembly of claim 13, wherein the internal electronics include an electro-optical (E/O) engine that transforms data signals between an electrical form and an optical form.

18. The plug assembly of claim 13, wherein the connector housing includes a plurality of housing shells, the second thermal-transfer module being secured to one of the housing shells or formed from one of the housing shells.

19. The plug assembly of claim 13, wherein the communication assembly includes a circuit board having a board edge and an array of mating terminals positioned along the board edge.

20. The plug assembly of claim 13, wherein the pluggable connector includes a communication assembly having a circuit board and the internal electronics include a processing unit that is coupled to the circuit board, the circuit board having a board window therethrough, wherein the first thermal-transfer module is disposed within the board window and positioned to absorb thermal energy from the processing unit.

* * * * *